(12) United States Patent
Vance et al.

(10) Patent No.: US 7,504,145 B2
(45) Date of Patent: Mar. 17, 2009

(54) POLYMERIC MATERIAL WITH RESISTANT STRUCTURE AND METHOD OF MAKING THE SAME

(75) Inventors: Jeffrey Duane Vance, Hugo, MN (US); Clifton Forrest Richardson, Woodbury, MN (US); Young-Hwa Kim, Hudson, WI (US)

(73) Assignee: Higher Dimension Materials, Inc., Oakdale, MN (US)

( * ) Notice: Subject to any disclaimer, the term of this patent is extended or adjusted under 35 U.S.C. 154(b) by 1130 days.

(21) Appl. No.: 10/075,180

(22) Filed: Feb. 13, 2002

(65) Prior Publication Data

US 2003/0134063 A1 Jul. 17, 2003

Related U.S. Application Data

(60) Provisional application No. 60/347,691, filed on Jan. 11, 2002.

(51) Int. Cl.
*B32B 3/02* (2006.01)
*A41D 19/00* (2006.01)

(52) U.S. Cl. .......................... 428/76; 428/33; 428/35.7; 428/911; 2/16; 2/161.7; 2/167; 2/169; 2/159

(58) Field of Classification Search ................ 428/34.1, 428/34.6, 36.1, 414, 415, 423.1, 35.7, 33, 428/76, 105, 109–113, 196, 246, 252, 284, 428/286, 902, 911; 2/161.7, 168, 167, 169, 2/2.5, 159, 16
See application file for complete search history.

(56) References Cited

U.S. PATENT DOCUMENTS

| 1,495,146 | A | 5/1924  | Ariente et al. |            |
|-----------|---|---------|----------------|------------|
| 2,893,314 | A | 7/1959  | Gore           |            |
| 3,179,551 | A | 4/1965  | Dudas          | 161/116    |
| 3,227,574 | A | 1/1966  | Mohr           | 117/45     |
| 3,553,066 | A | 1/1971  | Cavalier et al.| 161/73     |
| 3,633,216 | A | 1/1972  | Schonholtz     | 2/168      |
| 3,813,281 | A | 5/1974  | Burgess et al. | 161/159    |
| 3,867,727 | A | 2/1975  | Povlacs        | 2/167      |
| 3,925,034 | A | 12/1975 | Anna et al.    |            |
| 4,038,836 | A | 8/1977  | Rose           |            |
| 4,352,846 | A | 10/1982 | Passler et al. |            |
| 4,442,150 | A | 4/1984  | Greiner et al. | 428/53     |
| 4,569,874 | A | 2/1986  | Kuznetz        | 428/109    |
| 4,603,069 | A | 7/1986  | Haq et al.     | 428/76     |
| 4,623,574 | A | 11/1986 | Harpell et al. | 428/113    |
| 4,728,538 | A | 3/1988  | Kaspar et al.  |            |
| 4,742,578 | A | 5/1988  | Seid           | 2/2.5      |
| 4,793,354 | A | 12/1988 | Wright et al.  | 128/630    |
| 4,810,559 | A | 3/1989  | Fortier et al. | 428/161    |
| 4,833,733 | A | 5/1989  | Welch et al.   | 2/169      |
| 4,858,245 | A | 8/1989  | Sullivan et al.| 2/21       |
| 4,864,661 | A | 9/1989  | Gimbel         | 2/167      |

(Continued)

FOREIGN PATENT DOCUMENTS

EP   0 657 110 A1   8/1994

(Continued)

*Primary Examiner*—Michael C Miggins
(74) *Attorney, Agent, or Firm*—Faegre & Benson LLP (57) ABSTRACT

An elastomeric or polymer material or glove having enhanced cut or penetration resistance. The elastomeric or polymer material includes a penetration resistant structure while providing tactile sensitivity and flexibility.

7 Claims, 10 Drawing Sheets

U.S. PATENT DOCUMENTS

| | | | |
|---|---|---|---|
| 4,881,277 A | 11/1989 | Hogle | 2/169 |
| 4,901,372 A | 2/1990 | Pierce | 2/167 |
| 4,916,000 A | 4/1990 | Li et al. | 428/105 |
| 4,919,966 A | 4/1990 | Shlenker | 427/2 |
| 4,995,119 A | 2/1991 | Codkind | 2/163 |
| 5,020,162 A | 6/1991 | Kersten et al. | 2/164 |
| 5,070,540 A | 12/1991 | Bettcher et al. | 2/2.5 |
| 5,070,543 A | 12/1991 | Beck | 2/163 |
| 5,072,453 A * | 12/1991 | Widder | 2/2.5 |
| 5,087,499 A | 2/1992 | Sullivan | 428/85 |
| 5,087,516 A * | 2/1992 | Groves | 428/323 |
| 5,093,933 A | 3/1992 | Berry | 2/161 R |
| 5,132,167 A | 7/1992 | Prato | 428/251 |
| 5,138,719 A | 8/1992 | Orlianges et al. | 2/168 |
| 5,172,424 A | 12/1992 | Adkins | 2/21 |
| 5,173,966 A | 12/1992 | DeLeo | 2/168 |
| 5,187,023 A | 2/1993 | Prevorsek et al. | 428/911 |
| 5,187,815 A | 2/1993 | Stern et al. | 2/161 R |
| 5,196,252 A | 3/1993 | Harpell | 428/102 |
| 5,200,263 A | 4/1993 | Gould et al. | 428/323 |
| 5,210,877 A | 5/1993 | Newman | 2/2 |
| 5,231,700 A | 8/1993 | Cutshall | 2/161.7 |
| 5,259,069 A | 11/1993 | Gimbel | 2/163 |
| 5,306,532 A | 4/1994 | Tsien et al. | 428/33 |
| 5,308,683 A | 5/1994 | Dees, Jr. et al. | 428/195 |
| 5,317,759 A | 6/1994 | Pierce | 2/161.7 |
| 5,335,373 A | 8/1994 | Dangman et al. | 2/161.7 |
| 5,336,555 A | 8/1994 | Darras et al. | 428/247 |
| 5,345,612 A | 9/1994 | Stein | 2/168 |
| D351,930 S | 10/1994 | Snider et al. | D29/113 |
| 5,357,636 A | 10/1994 | Dresdner, Jr. et al. | 2/161.7 |
| 5,362,527 A * | 11/1994 | Harpell et al. | 428/33 |
| 5,368,930 A | 11/1994 | Samples | 428/323 |
| 5,407,612 A | 4/1995 | Gould et al. | 264/24 |
| 5,421,033 A | 6/1995 | DeLeo | 2/161.7 |
| 5,423,090 A | 6/1995 | Gimbel | 2/161.7 |
| 5,425,142 A | 6/1995 | Scott | 2/19 |
| 5,428,841 A | 7/1995 | Stein | 2/168 |
| 5,442,815 A | 8/1995 | Cordova et al. | 2/161.7 |
| 5,442,816 A | 8/1995 | Seketa | 2/161.7 |
| 5,448,777 A | 9/1995 | Lew | 2/161.7 |
| 5,459,879 A | 10/1995 | Fuchs | 2/161.7 |
| 5,500,957 A | 3/1996 | Stein | 2/169 |
| 5,511,241 A | 4/1996 | Ziegler | 2/2.5 |
| 5,515,548 A | 5/1996 | Lazarus | 2/169 |
| 5,548,844 A | 8/1996 | Ceresia | 2/161.7 |
| 5,564,127 A * | 10/1996 | Manne | 2/161.7 |
| 5,568,657 A | 10/1996 | Cordova et al. | 2/167 |
| 5,575,296 A | 11/1996 | Peck | 128/880 |
| 5,601,895 A | 2/1997 | Cunningham | 428/66.6 |
| 5,626,949 A | 5/1997 | Blauer et al. | 428/196 |
| 5,632,948 A | 5/1997 | Moore | 264/243 |
| 5,644,797 A | 7/1997 | Daneshvar | 2/161.7 |
| 5,665,810 A | 9/1997 | Patchett et al. | 524/449 |
| 5,677,029 A | 10/1997 | Prevorsek et al. | 428/113 |
| 5,687,424 A | 11/1997 | Masley | 2/163 |
| D389,608 S | 1/1998 | Kraatz | D29/123 |
| 5,706,520 A | 1/1998 | Thornton et al. | 2/21 |
| 5,709,920 A | 1/1998 | Danton | 428/68 |
| 5,745,919 A | 5/1998 | Kraatz | 2/161.6 |
| 5,752,279 A | 5/1998 | Hochmuth | 2/161.1 |
| 5,761,743 A | 6/1998 | Andrews et al. | 2/21 |
| 5,773,373 A | 6/1998 | Wynne et al. | 442/260 |
| 5,789,327 A | 8/1998 | Rousseau | 442/135 |
| 5,799,333 A | 9/1998 | McGarry et al. | 2/161.6 |
| 5,853,863 A | 12/1998 | Kim | 428/223 |
| 5,854,143 A | 12/1998 | Schuster et al. | 442/135 |
| 5,855,991 A | 1/1999 | McLarty, III | 428/195 |
| 5,883,021 A | 3/1999 | Beer et al. | 442/172 |
| 5,906,873 A | 5/1999 | Kim | 428/57 |
| 5,925,441 A | 7/1999 | Blauer et al. | 428/196 |
| 5,935,678 A | 8/1999 | Park | 428/105 |
| 6,000,055 A | 12/1999 | Citterio | 2/2.5 |
| 6,020,057 A | 2/2000 | Darras | 428/323 |
| 6,080,474 A | 6/2000 | Oakley et al. | 428/323 |
| 6,159,590 A | 12/2000 | Kim | 428/223 |
| 6,175,962 B1 * | 1/2001 | Michelson | 2/161.7 |
| 6,370,694 B1 * | 4/2002 | Michelson | 2/161.7 |
| 6,383,614 B1 | 5/2002 | Carson et al. | |
| 6,391,806 B1 | 5/2002 | Carson et al. | |
| 6,591,427 B1 | 7/2003 | Bennett | |
| 6,592,983 B1 | 7/2003 | Carson et al. | |

FOREIGN PATENT DOCUMENTS

| | | |
|---|---|---|
| FR | 2699265 A1 * | 6/1994 |
| GB | 787798 | 12/1957 |
| GB | 2 287 639 A | 9/1995 |
| GB | 2 302 794 A | 2/1997 |
| WO | WO 91/10409 | 7/1991 |
| WO | WO 92/08094 | 5/1992 |
| WO | WO 93/21492 | 10/1993 |
| WO | WO 95/07033 | 3/1995 |
| WO | WO 9607509 | 3/1996 |
| WO | WO 98/00039 | 1/1998 |
| WO | WO 0076430 | 12/2000 |
| WO | WO02/10667 | 2/2007 |

* cited by examiner

POLYMERIC MATERIAL WITH RESISTANT STRUCTURE AND METHOD OF MAKING THE SAME

The present application claims priority to U.S. Provisional patent application Ser. No. 60/347,691, filed Jan. 11, 2002, and entitled "PENETRATION RESISTANT POLYMERIC MATERIAL WITH GUARD PLATES AND METHOD OF MAKING THE SAME".

BACKGROUND OF THE INVENTION

The present invention relates to a flexible material having a resistant structure. In particular, the present invention relates to an elastomeric or polymer material including a penetration or cut resistant structure.

Latex or elastomeric gloves are worn to provide sterile protection during medical procedures or food preparation. Gloves made of latex or elastomeric materials provide good tactile sensitivity and flexibility so that the user can undertake various tasks without significant restriction. However, latex gloves do not typically provide cut or penetration resistance. Prior efforts to provide cut or penetration resistance for latex gloves have compromised tactile sensitivity or flexibility of the glove. The present invention provides a solution to these and other problems and provides advantages and features not recognized nor appreciated by the prior art.

SUMMARY OF THE INVENTION

The present invention relates to an elastomeric or polymer material having enhanced cut or penetration resistance. The elastomeric or polymer material includes a resistant structure to provide penetration or cut resistance while providing tactile sensitivity and flexibility.

DETAILED DESCRIPTION OF THE PREFERRED EMBODIMENTS

Figure 1:
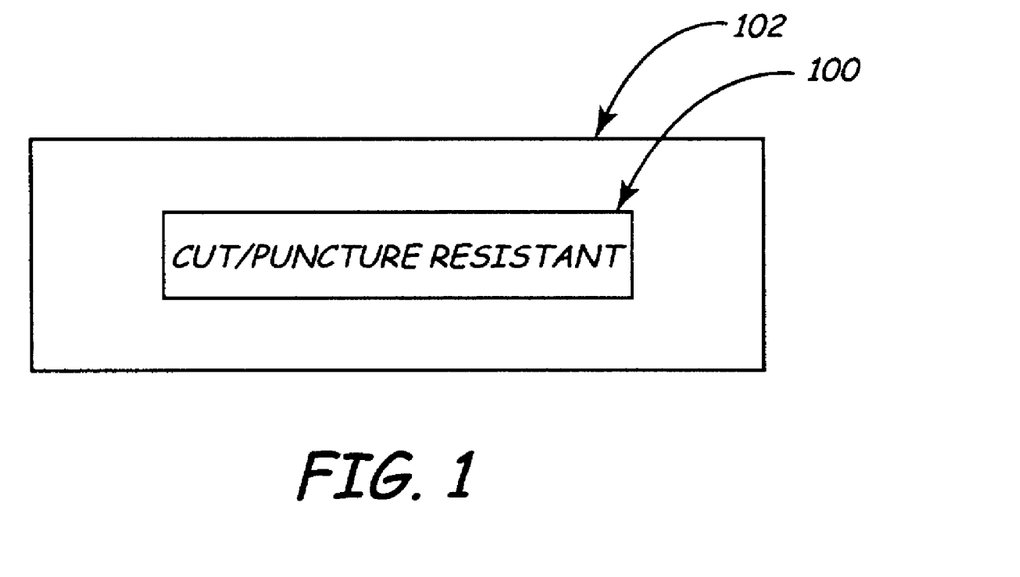
FIG. 1 schematically illustrates a polymer or elastomeric material having a resistant structure.

Elastomeric or polymer materials provide a barrier with desired flexibility and suppleness for various applications, including surgical gloves. However, elastomeric or polymer materials or gloves do not provide enhanced cut or penetration resistance. The material of the present invention includes a penetration resistant structure 100 as schematically shown in FIG. 1 to enhance cut or penetration resistance for a flexible elastomeric or polymer substrate or material 102.

Figure 2:
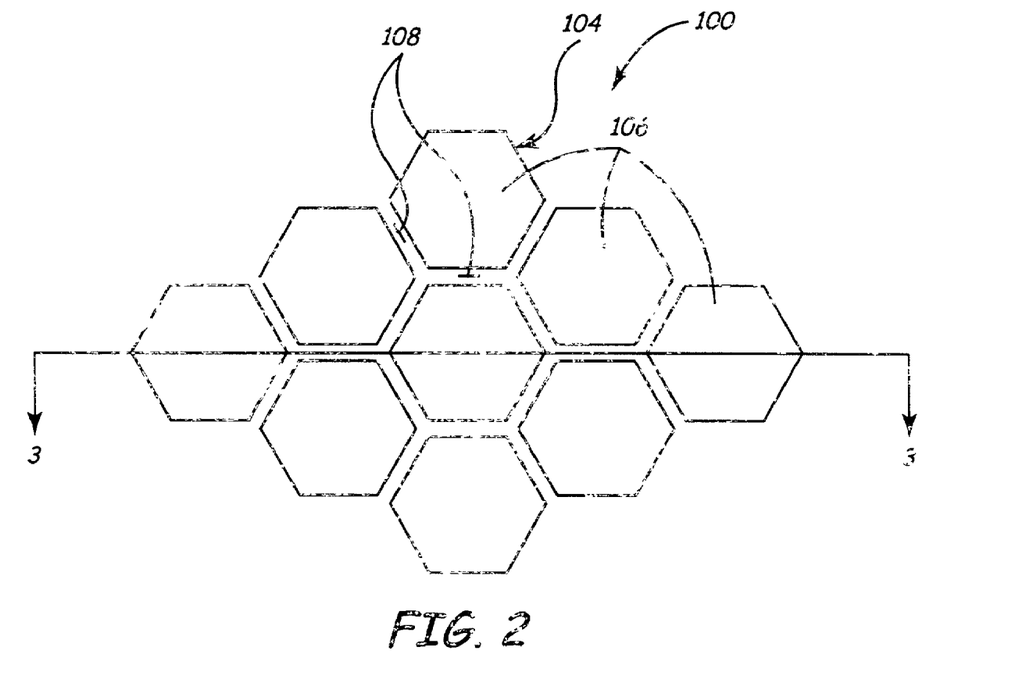
FIG. 2 schematically illustrates an array of relatively hard or resistant guard plates.
Figure 3:
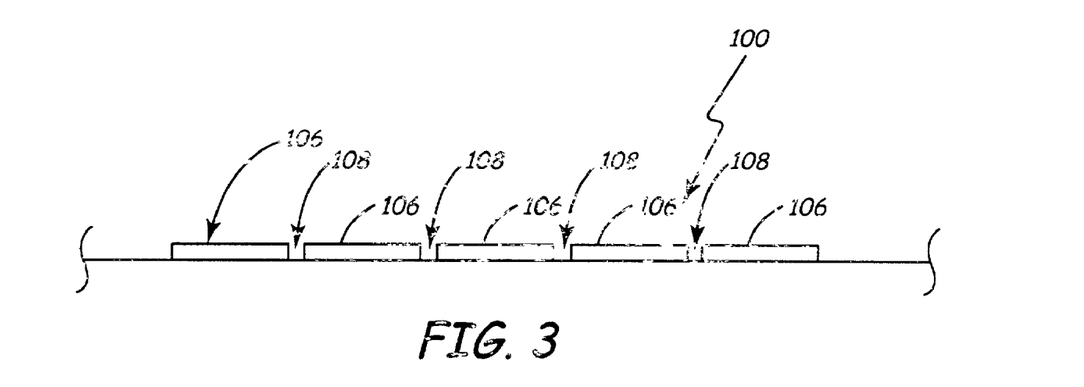
FIG. 3 is a cross-sectional illustration taken along line 3-3 of FIG. 2 of the hard or resistant guard plates.

In one embodiment shown in FIGS. 2-3, the resistant structure 100 includes a plurality or array 104 of relatively hard or resistant guard plates 106 to provide penetration or cut resistance. The guard plates 106 are formed of a material having a higher penetration resistance than the flexible polymer substrate or material 102. In the embodiment shown the penetration resistant material of the guard plates is relatively rigid and thus the guard plates are arranged in an array having a gap 108 or void between adjacent guard plates 106. The shape and dimension of the guard plates 106 and gap 108 are sized to optimize coverage of the guard plates 106 to provide penetration resistance while providing a sufficient gap or separation to provide relative flexibility for varied applications.

Figure 4:
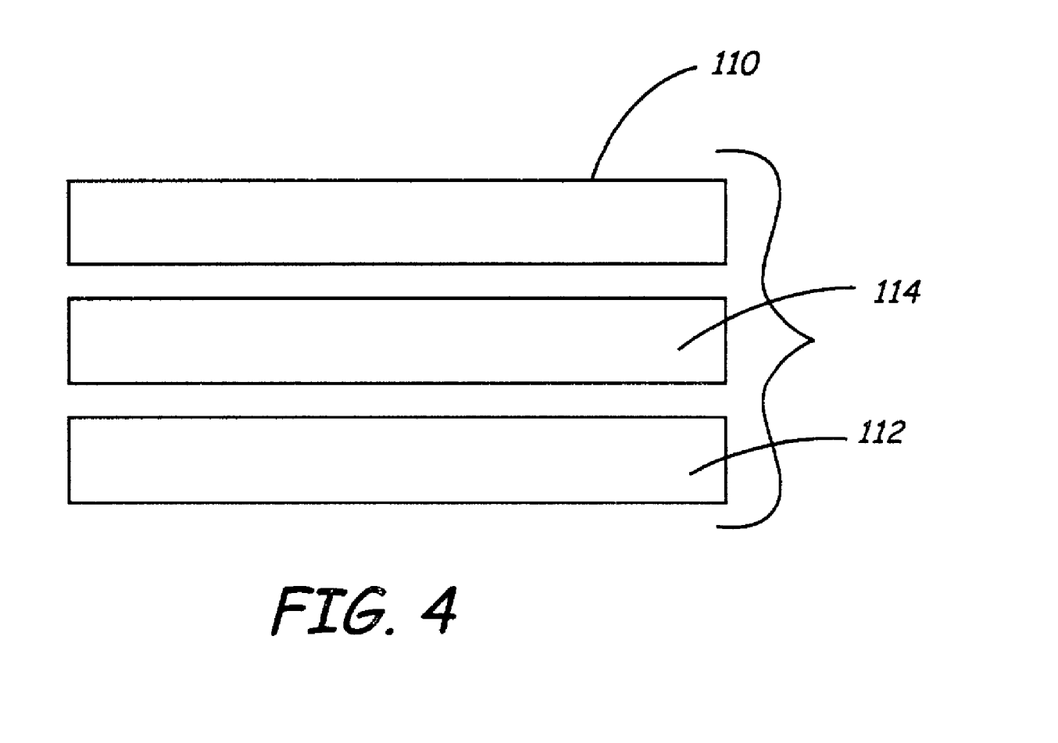
FIG. 4 is a schematic illustration of a resistant infrastructure between polymer or elastomeric layers.

A hexagonal pattern, such as that illustrated in FIG. 2, provides one pattern to optimize suppleness and cut or penetration resistance of the material. Although a particular hexagonal pattern is shown application is not limited to a hexagonal pattern or the particular pattern shown. The guard plate array 104 is formed on a flexible elastomeric or polymer substrate to provide penetration resistance for the elastomeric or polymer material or structure As schematically illustrated in the embodiment of FIG. 4, the material or structure includes flexible polymer or elastomeric layers 110, 112 and a penetration or cut resistant infrastructure 114 between the elastomeric or polymer layers 110, 112. In one embodiment resistant infrastructure 114 includes a guard plate array as illustrated in FIGS. 2-3 formed on a polymer substrate and interposed between the elastomeric layers 110, 112 to form the resistant infrastructure 114. The guard plate array includes guard plates having a higher penetration resistance than the elastomeric or polymer layers 110, 112.

Figure 5:
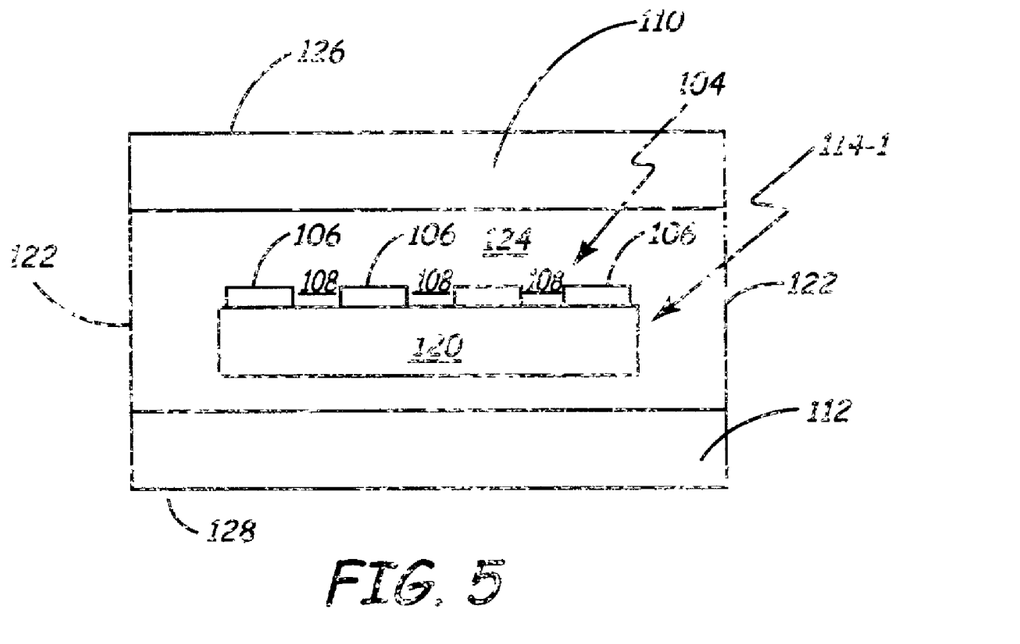
FIG. 5 schematically illustrates one embodiment of a material having a resistant infrastructure between polymer or elastomeric layers.

In one embodiment illustrated in FIG. 5, the resistant infrastructure 114-1 includes a guard plate array 104 formed on a substrate layer 120 and the resistant infrastructure 114-1 is interposed between the polymer layers 110, 112. The guard plates of the guard plate array are formed of a material having a higher penetration resistance than the elastomeric layers 110, 112. As schematically shown, a seam 122 connects a portion of layers 110, 112 to form an interspatial pocket 124 between the layers 110, 112 having the resistant infrastructure 114-1 disposed therein.

As shown, the elastomeric layers 110, 112 form outer surfaces 126, 128 of the material and the resistant infrastructure 114-1 is interposed therebetween to enhance cut and penetration resistance. In the illustrated embodiment, the infrastructure 114-1 is floatable disposed in the interspatial pocket 124 to limit interference with the flexible elastomeric layers 110, 112. The gaps 108 between guard plates 106 are void space and are not back filled with material which can interfere with and degrade flexibility of the resistant infrastructure or material.

Figure 6:
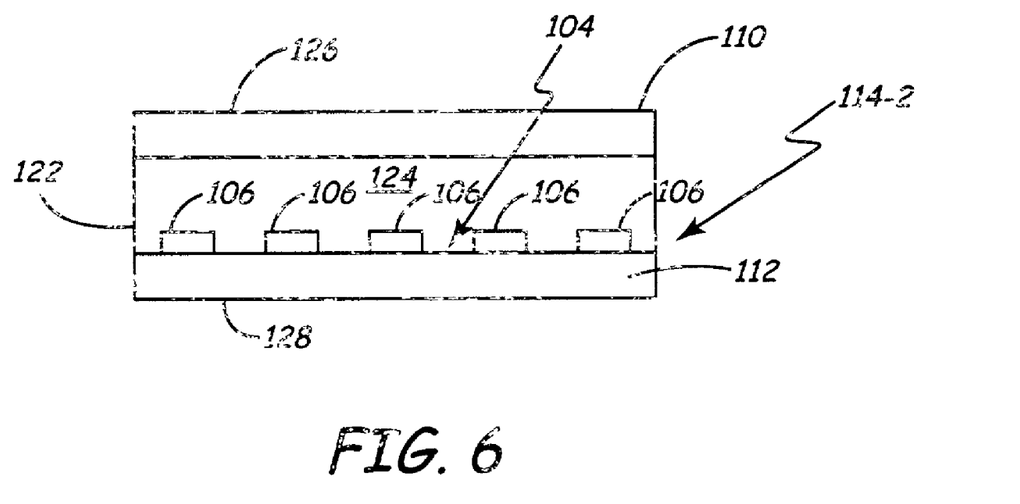
FIG. 6 schematically illustrates another embodiment of a material having a resistant infrastructure between polymer or elastomeric layers.

In another embodiment illustrated in FIG. 6, one of the elastomeric layers 110, 112 forms a substrate for the guard plate array 104. As shown, the guard plates 106 are formed on layer 112 and seam 122 connects a portion of layers 110, 112 to form the interspatial pocket 124 having the guard plates 106 disposed therein. Similarly the guard plates 106 are separated by a void space or gap 108 in the interspatial pocket 124 to limit interference with flexibility of the reinforced structure or material. The polymer or elastomeric layers 110, 112 form flexible outer surfaces 126, 128 of the reinforced polymer or elastomeric structure.

Figure 7:
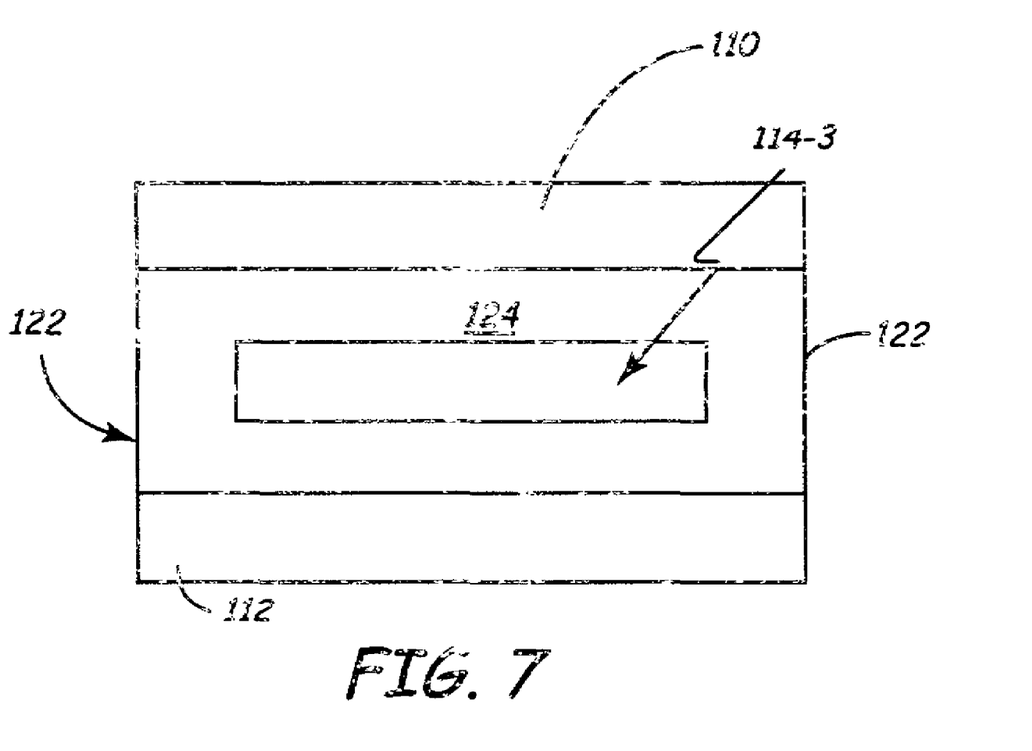
FIG. 7 schematically illustrates an alternate material having a resistant infrastructure between polymer or elastomer layers.

In an alternate embodiment as illustrated schematically in FIG. 7, the resistant infrastructure 114-3 includes a flexible cut or penetration resistant fabric or material having a higher penetration resistance than the polymer or elastomer layers 110, 112. The resistant infrastructure 114-3 is formed of a flexible penetration resistance fabric or fiber material such as Kevlar® (available from E.I. Du Pont de Nemours and Company of Wilmington Del.) or Spectra® a ultra high molecular weight polyethylene available from Honeywell Corp. of Morristown, N.J. as illustrated schematically. The resistant infrastructure 114-3 is flexible to limit interference with suppleness and provides cut or penetration resistance for the polymer or elastomer layers 110, 112 of the material.

Elastomeric gloves such as latex gloves provide a sterile interface for food preparation, medical and other applications. Such gloves can be produced inexpensively so that the gloves can be worn and discarded after use. As previously discussed, gloves formed of flexible elastomeric or latex materials do not provide significant cut or penetration resistance.

Figure 8:
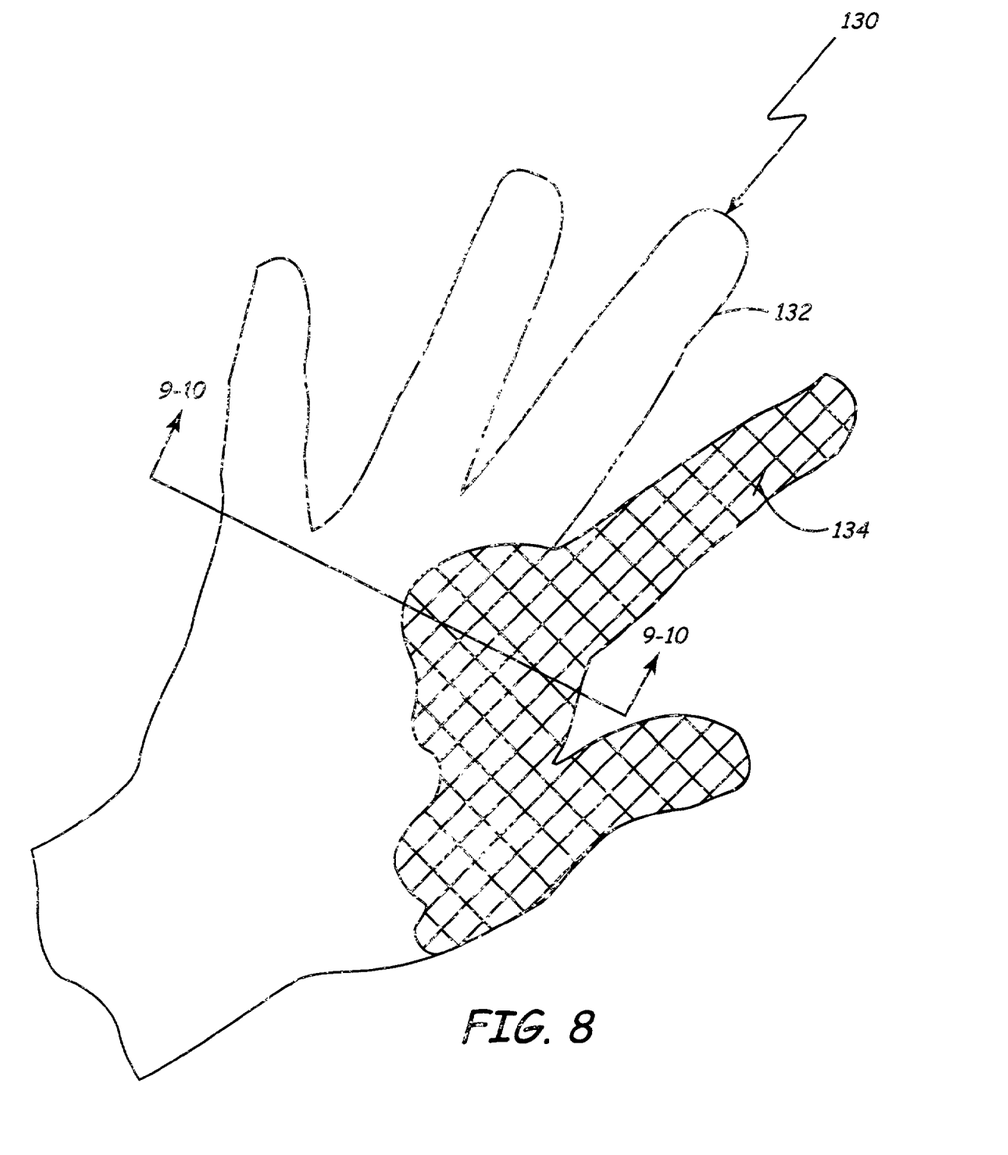
FIG. 8 illustrates a glove having a reinforced portion.

As illustrated in FIG. 8, the present invention includes an elastomeric glove 130 having a glove body 132 including a reinforced body portion 134 including a flexible resistant structure or infrastructure. Although in the illustrated glove of FIG. 8 a particular reinforced portion is shown, application is not limited to any particular reinforced region and the whole glove or other portions of the glove can be reinforced.

Figure 9:
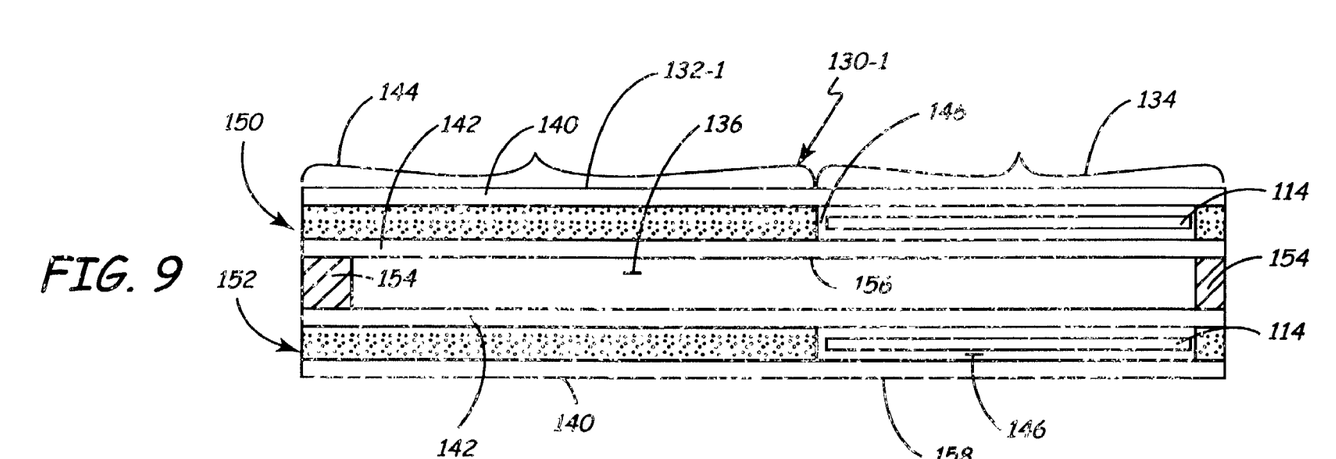
FIG. 9 schematically illustrates one embodiment of a glove having a reinforced portion.
Figure 10:
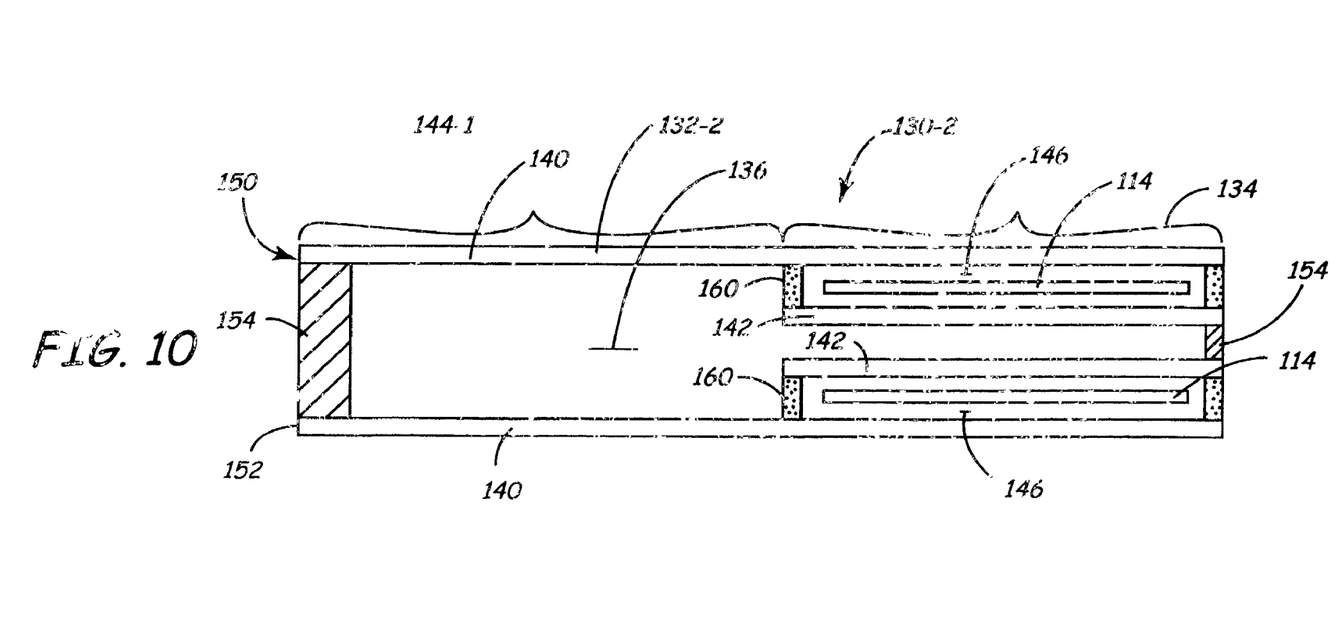
FIG. 10 schematically illustrates another embodiment of a glove having a reinforced portion.

FIGS. 9-10 illustrate alternate structural embodiments for a reinforced glove where like numbers refer to like parts in the previous FIGS. As shown in FIG. 9, glove body 132-1 encloses a body cavity 136. In the embodiment of FIG. 9, the glove body 132-1 includes multiple elastomeric layers 140, 142. Portions of the layers 140, 142 include a resistant infrastructure 114 therebetween to form the reinforced body portion 134 of the glove.

In particular, in the embodiment illustrated in FIG. 9, portions of the elastomeric body layers 140, 142 are laminated or sealed together to form a non-reinforced portion 144 of the body structure and portions of the body layers 140, 142 are not sealed to form an interspatial pocket 146 bounded by a seam formed by the laminated portions of the body layers 140, 142. The flexible resistant infrastructure 114 is interposed in the interspatial pocket 146 to form the reinforced body portion 134.

In the illustrated embodiment of FIG. 9, the glove body 132-1 is formed of multiple body sections 150, 152 which are joined along an edge portion to form a body seam 154 of the glove 130-1. The elastomeric body layers 140, 142 form inner and outer surfaces 156, 158 of the glove. The body layers 140, 142 are fabricated to provide a sterile outer surface and a relatively comfortable inner surface for interface with a hand inserted into the body cavity 136 of the glove for medical, food preparation or similar applications.

In particular, for medical or similar applications, the polymer or elastomeric body layers 140, 142 are formed of a breathable liquid impermeable material. The breathable material is a gas permeable material to allow air to circulate in and out and evaporated perspiration to escape therethrough. For example, the body layers 140, 142 can be fabricated of a polyurethane material which provides a breathable, liquid or fluid barrier for comfort and the infrastructure 114 can include guard plates 106 formed of a curable resin or epoxy (such as a UV curable resin or epoxy) for cut or penetration resistance.

FIG. 10 illustrates an alternate glove body structure 132-2 having a reinforced body portion 134. As shown, the reinforced body portion 134 includes multiple elastomeric or polymer body layers 140, 142 which are connected along a seam 160 to form the interspatial pocket 146 for the resistant infrastructure 114. In the illustrated embodiment, single body layer 140 forms the non-reinforced portion 144-1 of the glove body 132-2. As shown, glove body 132-2 is formed of multiple body sections 150, 152 which are joined along an edge portion to form the body seam 154 of the glove.

Figure 11:
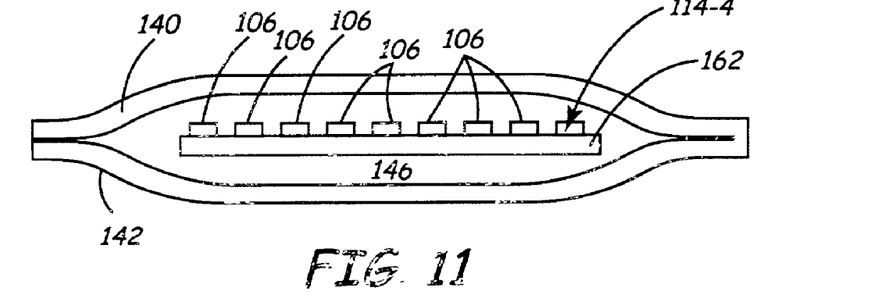
FIGS. 11-15 schematically illustrate embodiments of a resistant infrastructure for the reinforced portion of a glove.

FIGS. 11-15 illustrate embodiments of a flexible resistant infrastructure 114 to form the reinforced portion of the glove body. As shown in FIG. 11, resistant infrastructure 114-4 includes a polymer or elastomeric substrate layer 162 having an array of guard plates 106 deposited thereon and the substrate layer 162 is floatable disposed in the interspatial pocket 146 formed between layers 140, 142 as previously described.

In the illustrated embodiment, the substrate layer 162 is a formed of a polymer or elastomeric material, such as polyurethane, having an array of guard plates 106 fabricated thereon. The guard plates 106 are formed of a curable resin or epoxy material, for example a UV curable resin or epoxy such as N-51-5 UV curable resin available from Star Technology, Inc. of Waterloo, Ind. to form a flexible penetration or cut resistant structure on the flexible substrate layer 162.

Figure 12:
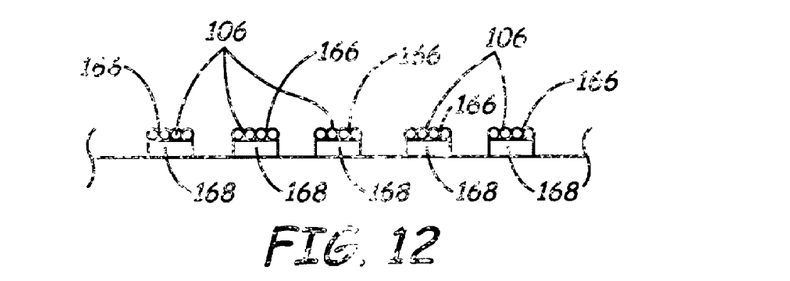

In a particular embodiment of FIG. 12, guard plates 106 include a glass or glass-like particle layer 166 on a curable hard base layer 168 formed of a curable epoxy or resin. The layer of glass particles or beads 166 is deposited on the curable base layer 168 prior to curing the base layer 168 to form a hard penetration resistant structure having a supplementary cut or puncture resistance layer in addition to the penetration resistant base layer.

Figure 13:
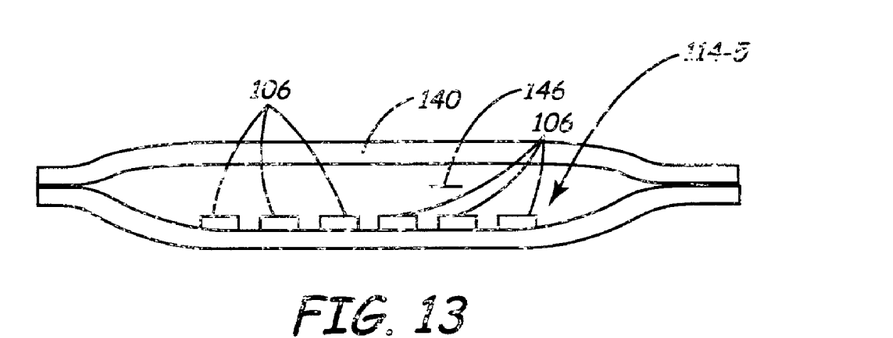

FIG. 13 illustrates a resistant infrastructure embodiment 114-5 wherein body layer 142 forms the substrate upon which guard plates 106 are formed. The body layers 140, 142 are sealed to form the interspatial pocket 146 between the body layer 140 and body layer 142. The body layer 142 and the guard plates 106 fabricated on the body layer 142 form the resistant infrastructure 114-5. For example, guard plates 106 can be formed of a UV curable resin or epoxy formed on a polyurethane body layer 142 to form the flexible resistant infrastructure 114-5.

Figure 14:
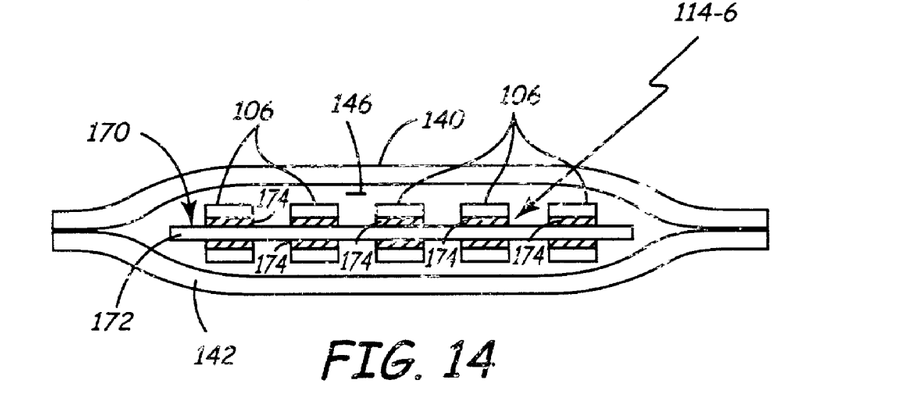

FIG. 14 illustrates another embodiment of a resistant infrastructure 114-6 where like numbers are used to refer to like parts in the previous FIGS. In the illustrated embodiment, the infrastructure 114-6 includes guard plates 106 formed on a composite mesh substrate 170 including a wire mesh, such as a metal wire mesh and a relatively flexible porous polymer connecting material 172, such as a polyester chiffon. Guards plates 106 are spaced on the substrate 170 to fabricate the reinforced infrastructure 114-6 including guard plates 106 having a wire mesh reinforced portion 174 on the flexible connecting material 172. The fabricated infrastructure 114-6 is interposed in the interspatial pocket 146 between body layers 140, 142 to provide cut or penetration resistant for the glove on a flexible supple connecting material 172.

In particular embodiments, the guard plates 106 are fabricated on an elastomeric or polymer substrate or material by depositing a flowable curable resin or material and curing the flowable resin or material The guard plates and substrate are formed of materials which bond or adhere when cured so that the guard plates adhere to the surface of the substrate to form the resistant infrastructure. The guard plate array structure having gaps therebetween can be fabricated by using printing, etching and/or masking processes. The flowable material is exposed to a radiation source to cure the flowable material to form the rigid penetration resistant material of the guard plates.

In one embodiment, guard plates are fabricated on a polymer or elastomeric substrate via a printing process. For example, the resin material can be deposited on a polyurethane film substrate and cured to form the guard plate array. In particular, the guard plates can be formed of a curable resin material which is deposited on the polyurethane film and cured by a radiation source directed at the material so that the guard plates bond to or adhere to the polyurethane film substrate. The flowable resin or material deposited on the polyurethane film substrate should be cured within a limited time, such as 15 minutes to limit absorption of the uncured resin or epoxy into the polyurethane substrate to limit swelling of the substrate.

In one embodiment, the curable resin is deposited on the polymer or elastomeric substrate using a screen printing technique. In particular, a screen having a plurality of openings is placed on the substrate. A layer of resin is deposited in the openings of the screen by pulling a squeegee across the screen to fill the openings. Thereafter the screen is removed and the deposited material is cured to form the guard plates having void space therebetween. In one embodiment, the screen has a thickness of 10 mil and 3% cabosil (by weight) is added to the resin to increase viscosity of the resin to limit material flow after the screen is removed and prior to curing the resin. In the illustrated embodiment, the guard plates have a thickness of approximately 15 mils.

In another embodiment, as described with reference to FIG. 14, guard plates 106 are fabricated on a composite mesh substrate including a polymer connecting layer 172 and a metal wire mesh using a masking and etching process. First the composite mesh substrate 170 is embedded in a resin material so that the resin material absorbs into or through the substrate. A mask pattern having openings to form the array of guard plates is used to cure portions of the resin material to form the guard plate array. Thereafter the uncured resin between cured portions is removed and exposed metal mesh portions between the guard plates is etched to form a plurality of metal mesh reinforced guard plates on a flexible polymer connecting material.

Figure 15:
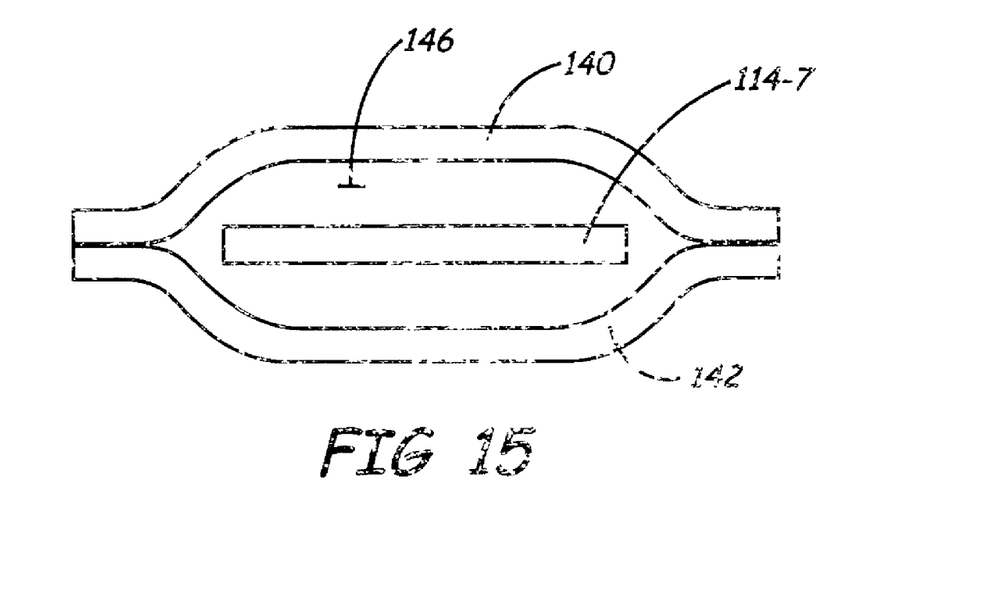
Figure 16:
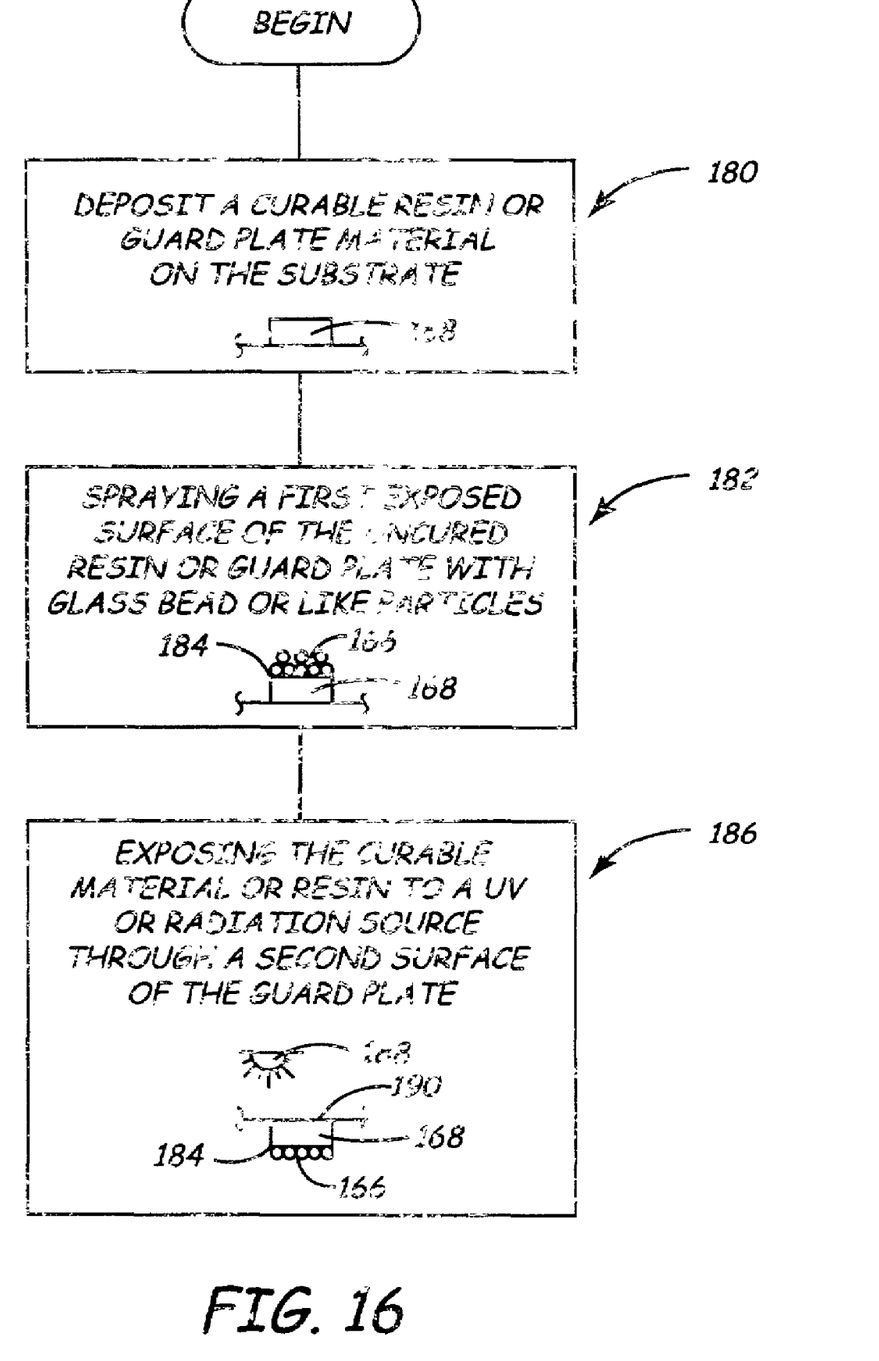
FIG. 16 illustrates a fabrication embodiment for a resistant infrastructure including glass particles or beads.

FIG. 15 schematically illustrates another embodiment of a resistant infrastructure 114-7 where like numbers are used to refer to like parts in the previous FIGS. The resistant infrastructure 114-7 is formed of a relatively flexible penetration resistant material such as Kevlar® or Spectra®. The resistant infrastructure 114-7 is interposed in the interspatial pocket 146 between the flexible polymer layers 140, 142 to provide penetration resistance for the polymer layers As previously described with respect to FIG. 12, the guard plates can be formed of a base layer 168 and the base layer 168 can be coated or sprayed with a layer of glass particles. As illustrated in FIG. 16, for fabrication, the curable base layer 168 is deposited or printed on a substrate as illustrated by block 180. Thereafter, a glass particle layer 166 is sprayed on the curable base layer 168 as illustrated by block 182 to disperse particles over a surface area of the base layer 168. The glass particles or beads are sprayed on a first surface 184 of the uncured base layer 168 so that the glass particles disperse or adhere to a surface portion of the uncured layer. The spraying process allows the glass beads or particles to be evenly dispersed across the surface of the base layer, ensuring a high percentage of surface area coverage.

Thereafter, the curable layer is cured as illustrated by block 186. In the illustrated embodiment, layer 168 is cured by supplying a radiation source 188 through the substrate towards a second surface 190 of the base layer 168 to cure the base layer 168. Since the radiation source 188 is directed through the second surface 190 and not surface 184 having particles thereon, the particles are not interposed in the radiation path so that the particles do not interfere with or scatter the radiation interfering with the curing process. For example, in one embodiment, the glass beads or particles have a diameter or size of approximately 2-9 mils to provide supplemental penetration resistance.

Figure 17:
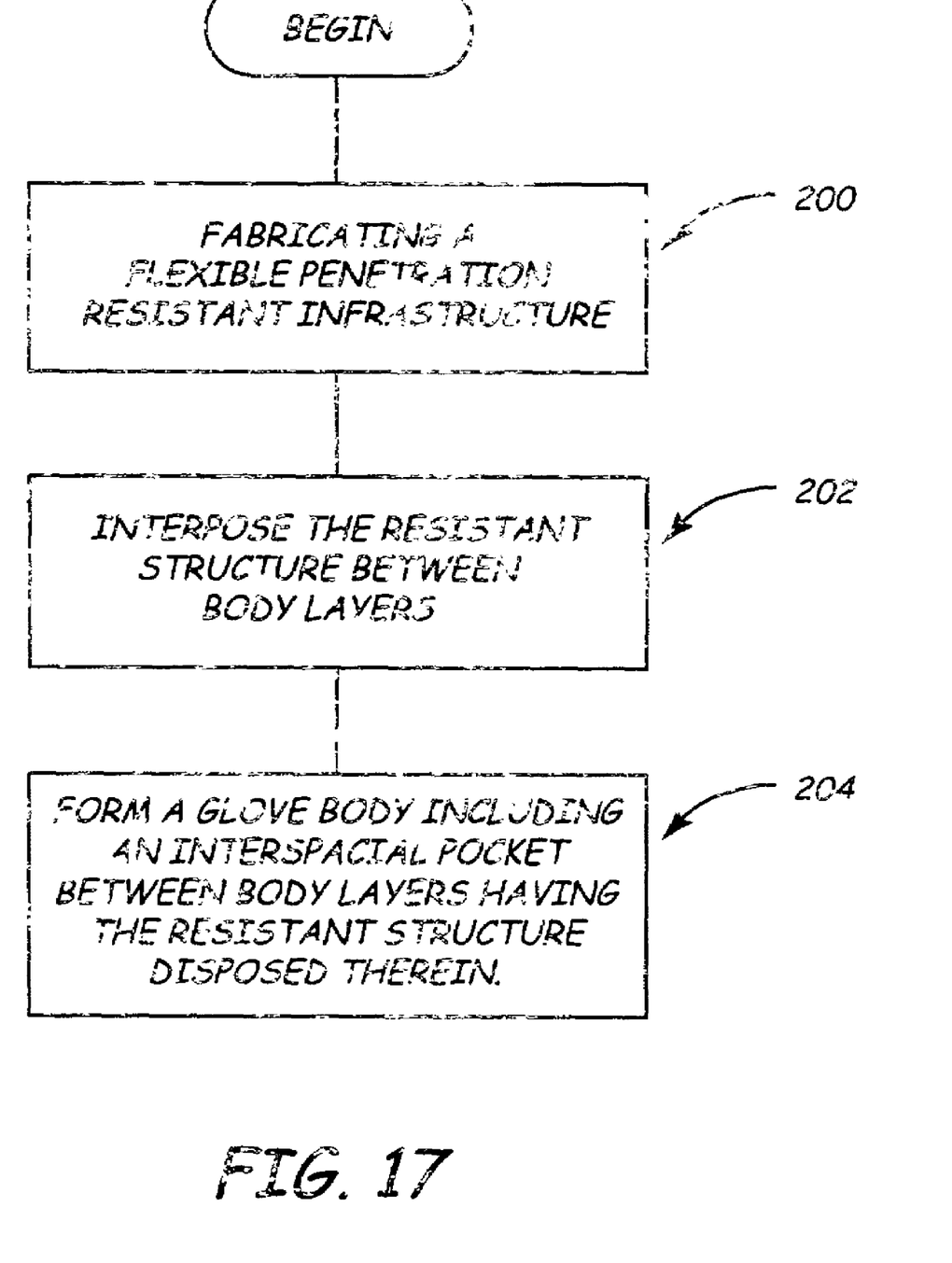
FIG. 17 illustrates a fabrication embodiment for a glove having a reinforced portion.

As previously described, the illustrative materials or embodiments provide a reinforced portion or structure for a glove. FIG. 17 illustrates a fabrication embodiment for a glove including a reinforced portion or structure. As illustrated by block 200, a flexible resistant infrastructure is fabricated. In particular, fabrication of the resistant infrastructure includes fabrication of a guard plate array on a substrate. For example, the array of guard plates may include a plurality of hexagonal shaped guard plates having a minor diameter of about 80 mils forming a closely spaced triangular pattern as illustrated in FIG. 2 having a gap spacing between adjacent guard plates of approximately 10 mils.

As illustrated by block 202, the resistant infrastructure is interposed between elastomeric or polymer body layers. Thereafter, the glove body is formed including an interspatial pocket between the body layers having the resistant infrastructure disposed therein as illustrated by block 204. In one embodiment, portions of the multiple body layers are laminated to form a seam defining the interspatial pocket having the resistant infrastructure disposed therein.

In an illustrated embodiment described, the glove body is formed of multiple body sections including multiple body layers and a resistant infrastructure. For fabrication, the multiple body sections and component layers are die cut and sealed or laminated around the cut perimeter edge portions to form the glove body having the reinforced portion including the resistant infrastructure as described. The process of die cut and sealing the cut perimeter edge portions can be done in a single process step to enhance production.

In particular, the body layers are formed of a thermoplastic material, such as polyurethane to provide a heat sealable seam between body sections to form a gas-tight and waterproof seal. In one embodiment, polyurethane body layers are 2 mils thick and are heat sealed at a temperature of about 290° Fahrenheit and a pressure of 98 p.s.i. The seam can be formed using various sealing processes, for example, the seam can be sealed or formed using a RF (radio frequency) heating or sealing process or a dielectric heating or sealing process based upon the materials selected and application is not limited to a particular heat seal or seam.

Figure 18:
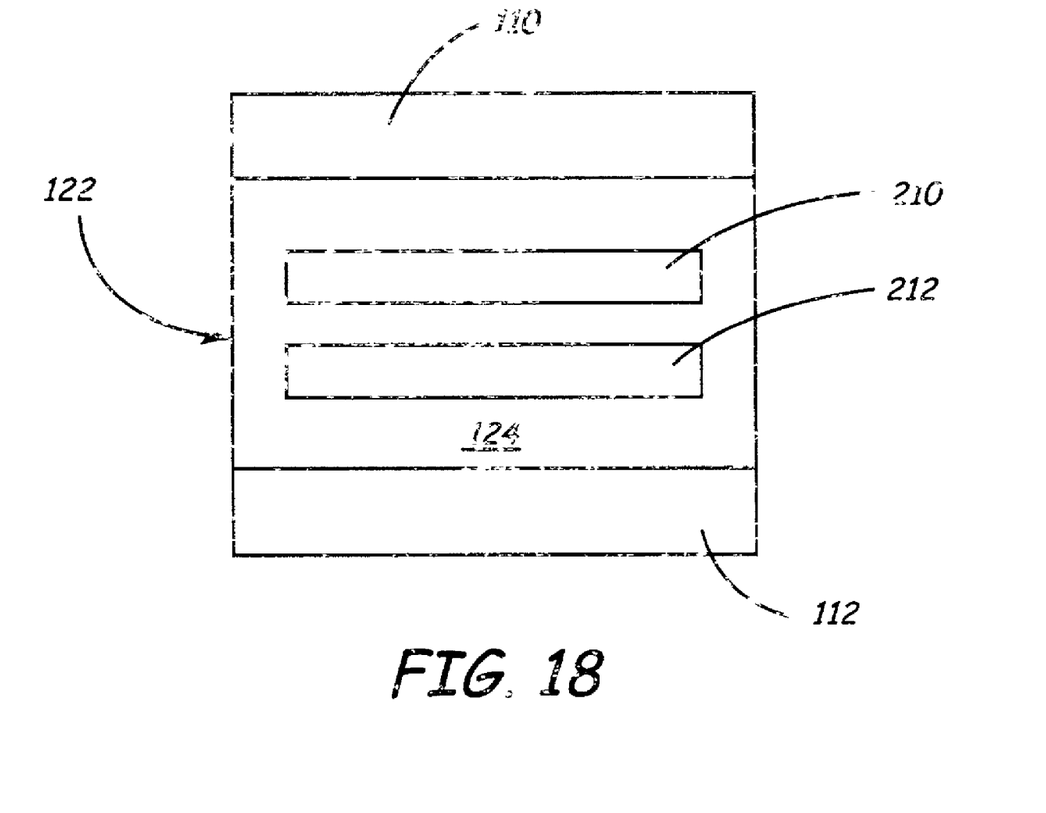
FIG. 18 schematically illustrates a material embodiment including multiple infrastructures or layers interposed in an interspatial pocket between elastomeric or polymer layers.

Although application of the present invention includes a resistant infrastructure including a single resistant structure, the resistant infrastructure can include multiple resistant infrastructures or layers 210, 212 as schematically illustrated in FIG. 18 to provide desired penetration resistance. The multiple resistant infrastructures can include multiple guard plate array layers which can be disposed in the interspatial pocket out of registration to increase resistance coverage 124 of the guard plate structure or material.

Although the present invention has been described with reference to preferred embodiments, workers skilled in the art will recognize that changes may be made in form and detail without departing from the spirit and scope of the invention.

What is claimed is:

1. A cut resistant glove, including:
   a first thermoplastic polymer hand-shaped layer;
   a cut resistant infrastructure element attached to one or more portions of the first hand-shaped layer, each infrastructure element including:
      a thermoplastic polymer substrate;
      an array of small, regularly-spaced, generally uniform thickness, non-overlapping, hard, convex polygon-shaped, printed polymer material plates separated by gap sections, the plates arranged in a predetermined pattern free from extended-length straight gap sections and having an area parallel to the polymer substrate with major and minor length dimensions on a surface of the substrate, the major length dimension to minor length dimension aspect ratio between about 3 and 1, and wherein widths of the gaps between adjacent plates are substantially less than the lengths of the minor dimensions, a thickness of the plates is substantially less than the length of the minor dimensions, and the overall cut resistance of the infrastructure element is substantially greater than a cut resistance of the polymer substrate; and
      a heat seal seam between the polymer substrate and the first hand-shaped layer to attach the infrastructure element to the first hand-shaped layer with the plates facing the first hand-shaped layer;
   a second thermoplastic polymer hand-shaped layer; and
   a heat seal seam between the first and second hand-shaped layers to attach the first and second hand-shaped layers, the first and second layers forming a hand-shaped cavity.

2. The glove of claim 1 wherein the first and second hand-shaped layers are elastomeric polymer.

3. The glove of claim 1 wherein the plates of the infrastructure elements include curable polymer.

4. The glove of claim 1 and further including a void space between the plates of the infrastructure elements and the first hand-shaped layer.

5. The glove of claim 1 wherein the plates of the infrastructure have a minor dimension length of about 80 mils and the gaps between the plates are about 10 mils.

6. The glove of claim 1 wherein the infrastructure elements are located on substantially all of the first hand-shaped layer.

7. The glove of claim 1 wherein the infrastructure elements are located on only portions of the first hand-shaped layer.

* * * * *